United States Patent [19]
Quirke

[11] 3,940,662
[45] Feb. 24, 1976

[54] SATURABLE REACTOR FOR PINCUSHION DISTORTION CORRECTION

[75] Inventor: Patric C. Quirke, Whitewater, Wis.

[73] Assignee: Whitewater Electronics, Inc., Whitewater, Wis.

[22] Filed: Mar. 14, 1974

[21] Appl. No.: 450,990

[52] U.S. Cl. .............................. 315/400; 315/371
[51] Int. Cl.² ....................................... H01J 29/56
[58] Field of Search ................... 315/400, 371, 370

[56] References Cited
UNITED STATES PATENTS

| | | | |
|---|---|---|---|
| 3,346,765 | 10/1967 | Barkow ............................... | 315/400 |
| 3,433,998 | 3/1969 | Wolber .............................. | 315/400 X |
| 3,444,422 | 5/1969 | Wolber .............................. | 315/400 X |
| 3,609,447 | 9/1971 | Hirota et al. ...................... | 315/400 |
| 3,611,004 | 10/1971 | Smith et al. ....................... | 315/400 |
| 3,716,748 | 2/1973 | Sohoma .............................. | 315/400 |
| 3,781,500 | 12/1973 | Chapman ............................ | 315/371 |

Primary Examiner—Maynard R. Wilbur
Assistant Examiner—G. E. Montone

[57] ABSTRACT

A saturable reactor for correction of pincushion distortion of a TV picture tube raster has, in one form, a magnetically saturable two window core. A single wire control coil is wound transversely around the central leg segment of the core and is connected with the vertical frequency sawtooth driver in a parabolic wave shaping network. A first load coil, wound transversely around one outer core leg, is connected in series circuit with the horizontal frequency sawtooth driver and the horizontal deflection coils. A second load coil is wound around the exterior of the core, in lengthwise embracing relation to its other outer leg, and is connected in series with the vertical deflection coils and also in a phase inverting resonant loop circuit.

10 Claims, 12 Drawing Figures

SATURABLE REACTOR FOR PINCUSHION DISTORTION CORRECTION

This invention relates to apparatus for correcting pincushion distortion of the raster of a cathode ray tube, and is more particularly concerned with a novel saturable reactor device and with circuitry by which said device can be connected with electromagnetic deflecting apparatus for a cathode ray tube to correct distortion of the raster.

Pincushion distortion of the raster of a cathode ray tube used for television display is a distortion of the raster out of its normal and desired rectangular configuration, such that the raster has outwardly projecting corners and concavely bowed edges. The causes of pincushion distortion are well known. Briefly and generally, it results from the fact that the viewing screen of the tube is flatter than a spherical surface which has its center of curvature at or near the center about which the electron beam is deflected. It is also well known that the tendency toward pincushion distortion increases with increasingly wide angle of the tube and is thus most pronounced in the axially short tubes with comparatively flat screens that are regarded as most desirable and are favored for modern television receivers.

The problem of correcting for pincushion distortion is a complicated one, owing to the fact that a correction must be applied to the deflection of the beam along each of its axes of deflection, which correction, for each axis, must vary nonlinearly with the progress of the beam along the other axis.

A number of different solutions to this problem have heretofore been proposed. Like the present invention, most of these took advantage of the nonlinear magnetic properties of the core of a saturable reactor. One exception is disclosed by the 1954 Lockhart U.S. Pat. No. 2,682,012. The rather complicated and expensive apparatus of that patent was intended for only top and bottom correction. The Lufkin U.S. Pat. No. 2,842,709, disclosed an apparently complementary circuit incorporating a saturable reactor, intended for side correction. The apparatus represented by a combination of the Lockhart and Lufkin teachings has been rendered obsolete by later developments.

U.S. Pat. No. 3,329,861, to W. H. Barkow et al, discloses a four-window saturable reactor employed for only side correction. The substantially concurrent patent to Barkow, U.S. Pat. No. 3,346,765, discloses a two-window saturable reactor employed for only top and bottom correction. The saturable reactor devices disclosed in these two patents had to be used in combination to achieve complete correction of pincushion distortion.

A somewhat later U.S. Pat. No. 3,444,422, to J. Wolber, discloses a single two-window saturable reactor that accomplished complete pincushion correction. Although the apparatus of the Wolber patent was both simple and inexpensive, it had certain serious disadvantages. The load coils of the saturable reactor, which were wound around the outer legs of its core and connected in series with one another, were connected across the horizontal deflection coils, in parallel with them, in order to present, with the horizontal deflection coils, a substantially constant load impedance to the horizontal sawtooth driver. The rather high voltage across the horizontal deflection coils was thus impressed across the load coils of the saturable reactor, requiring careful design and manufacture of that device to ensure that it would not be subject to short circuiting failure in use.

During the time since the Wolber patent issued, the television receiver industry has moved in the direction of lower voltages across the horizontal deflection coils but higher currents through them. This trend has in some measure reduced the short-circuiting risk inherent in the Wolber apparatus, but other recent developments have emphasized other deficiencies in it. For one thing, the connection of the saturable reactor coil in parallel with the horizontal deflection coils consumed a substantially greater amount of energy than would have been needed with a series connection, and of course such unnecessary expenditure of energy is no longer regarded as inconsequential. A more serious objection to this parallel coil connection in the Wolber apparatus arose when television receiver manufacturers adopted the practice of regulating the voltage across the horizontal deflection circuit. Because a constant voltage now tends to be maintained across the horizontal deflection coils, a correction coil in parallel with them is ineffective to influence the current through them. After the general adoption of such current regulation, the usual commercial practice was to use separate saturable reactors for top and bottom correction and for side correction, the circuit for side correction being generally like that of Lufkin.

In brief, therefore, the apparatus of the Wolber patent is not well suited to present conditions and requirements.

To avoid interlace problems, U.S. Pat. No. 3,329,859 to E. Lemke, proposed the use of a bifilar winding for the control winding on the central leg of the two-window core, which was connected in the vertical deflection circuit. The bifilar winding trapped out the horizontal frequency component and prevented it from entering the vertical deflection circuit, but it was rather expensive to manufacture. The last mentioned patent was concerned only with the correction of top and bottom distortion. A companion Lemke U.S. Pat. No. 3,329,862 discloses that side-to-side distortion was intended to be corrected with the use of a four-window saturable reactor like that of the above mentioned Barkow et al U.S. Pat. No. 3,329,861.

U.S. Pat. No. 3,390,364, to M. Russell, discloses another type of saturable reactor intended for top and bottom correction. The device of the Russell patent comprised a tubular core of magnetically saturable material, a control coil wound circumferentially around the core, and a load or signal coil wound toroidally around the core. Since the load coil had to be wound through the core of the tubular core, it could not be wound on a bobbin apart from the core, and the device was therefore comparatively costly. Because of this and certain other disadvantages, the saturable reactor of the Russell patent did not have widespread commercial use.

The most nearly successful apparatus heretofore available for effecting complete pincushion correction in a modern television receiver with a wide angle tube has been the widely used one that comprised two saturable reactors, each having at least four connections to circuit components external to it. In addition to needing more space, more installation labor and more costly complementary circuitry than is now seen as necessary, each of these saturable reactors was in itself relatively costly, having series-connected outer coils that had oppositely poled coupling to the core and had to be carefully balanced.

By contrast, it is a general object of the present invention to provide apparatus for complete correction of pincushion distortion comprising a single compact saturable reactor device that can be manufactured at low cost, can be readily and quickly adapted to meet the correction requirements of the particular circuitry and tube with which it is intended to cooperate, and can be assembled into a television receiver with substantially less labor and expense than prior devices intended for the same purpose.

More specifically, it is an object of this invention to provide a saturable reactor device of the type having a control coil through which a current of one frequency is intended to flow, a load coil through which a current of substantially different frequency is intended to flow, to be modified by the current through the control coil, and a saturable core upon which both coils are wound, said saturable reactor having such configuration that its coils can be single wire windings that need not be connected with one another and can be wound apart from its core on bobbins that can be readily assembled axially onto the core.

Another specific object of this invention is to provide a saturable reactor for complete pincushion correction (i.e., top and bottom correction and side correction) that has only six connections to other components of the circuitry with which it cooperates, as compared with the minimum of eight such connections for prior saturable reactor devices suitable for modern applications.

A further specific object of this invention is to provide a saturable reactor that can be connected in a pincushion correction circuit in series with horizontal deflection coils, and which therefore has only a relatively low voltage impressed across it, does not entail any unnecessary energy consumption on the part of the horizontal deflection circuit, and is compatible with contemporary voltage-regulated circuitry.

Still another object of this invention is to provide a saturable reactor of general utility which possesses the desirable attributes of the device of the above mentioned Russell patent without the undesirable characteristics of that device and which, in particular, can be made at substantially lower cost, can be adjusted more readily and much more accurately, and which is well suited for many applications to which the prior device was not adapted.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate several complete examples of embodiments of the invention constructed according to the best modes so far devised for the practical application of the principles thereof, and in which:

FIG. 3b is a circuit diagram of a modification of the vertical deflection circuit in apparatus otherwise identical with that illustrated in FIG. 3a;

Referring now more particularly to the accompanying drawings, the saturable reactor 4 of this invention, in a preferred form thereof, comprises, in general, a magnetically saturable two-window core 5 upon which are wound a control coil 6, a first load coil 7 and a second load coil 8.

Figure 4:
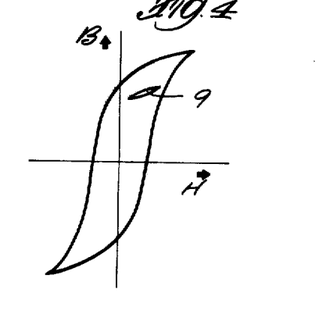
FIG. 4 is a curve of magnetic flux vs. magnetizing direct current (hysteresis curve) that is typical of the core of a saturable reactor embodying the principles of this invention.

The core 5 is made of a material, such as ferrite, that has the characteristic hysteresis curve illustrated in FIG. 4, wherein magnetizing force H due to a d.c. control current is plotted horizontally and flux density B in the core is plotted vertically. As is generally characteristic of saturable reactors, the device of the present invention is intended to operate in a restricted portion 9 of the B/H hysteresis loop that is near the knee of the curve for nonlinearly increasing flux density with rising magnetizing force.

Figure 1:
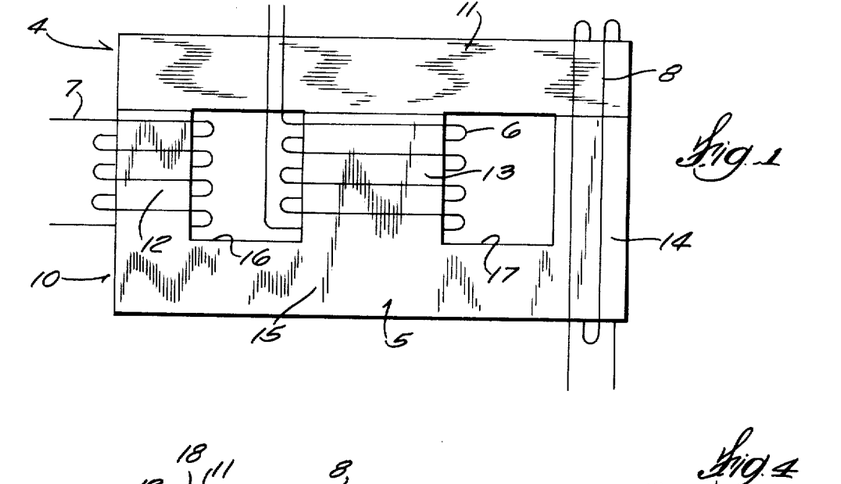
FIG. 1 is a diagrammatic plan view of a saturable reactor embodying the principles of the present invention, in a form especially suitable for use in the pincushion distortion correction circuit of a television receiver.

The core is preferably formed in two parts that are respectively designated by 10 and 11. The core part 10 is substantially E-shaped, with three spaced apart, parallel leg segments 12, 13 and 14 and a connecting segment 15 that extends transversely to the leg segments across one end of each and connects them with one another. The other part 11 of the core is simply a straight and elongated I-segment that extends parallel to the connecting segment 15 across the opposite ends of the legs to cooperate with the core part 10 in defining two windows 16 and 17.

Because the I-segment 11 is formed separately from the E-shaped part 10 of the core, the two parts cooperate to define a small air-gap in the core. Owing to the somewhat unpredictable shrinkage that a ferrite part undergoes in the process of its formation, the permeability of a ferrite part, in itself, is only very roughly predictable. An air gap in a ferrite core can very substantially decrease its permeability without materially altering its nonlinear saturation characteristics; hence the permeability of the core can be more easily and accurately controlled by controlling the air gap than by attempting to control the parameters of the core material itself. Inasmuch as the air gap in the present core is in the magnetic circuit for each of the leg segments 12, 13 and 14, the permeability of the core as a whole can be readily and accurately controlled by adjusting the size of the air gap, as with the use of a selected thickness of paper or other nonmagnetic material. The provision for such control of the permeability of the core is of course an important and very desirable feature of the saturable reactor of this invention.

The central leg segment 13 of the core has a cross section area (as measured normal to its length) which is larger than that of either of the outer leg segments 12 or 14, so that it is less readily saturable than either of them. Preferably its cross section area is twice that of each of the outer leg segments, to provide for flux circuit symmetry.

The control coil 6 is wound transversely around the central leg segment 13 of the core; that is, it passes through both of the windows 16 and 17 and has its axis within the central leg segment and extending lengthwise thereof. Of course the control coil can be readily wound on a bobbin 18 apart from the core and can be slipped axially onto the central leg of the E-shaped core portion 10 before the I-segment 11 is fastened in place.

In like manner the first load coil 7 is wound transversely around one outer leg 12 of the core, preferably on a bobbin 19.

The second load coil 8, however, is wound around the exterior of the core, with its turns in lengthwise embracing relationship to the other outer leg segment 14 and also embracing the I-segment 11 as well as the connecting segment 15. Thus the axis of the second load coil is transverse to that of the control coil as well as to the axis of the first load coil. Because of this orientation of the second load coil, it is so coupled with the core that its reactive impedance varies with the flux density in the outer core leg segment 14 that it embraces, but it does not have a transformer type of coupling with either the control coil or the first load coil. It will be understood that the second load coil can be wound on a bobbin 20, apart from the core, and can be assembled axially onto the core after the two core parts 10 and 11 are connected.

Figure 3A:
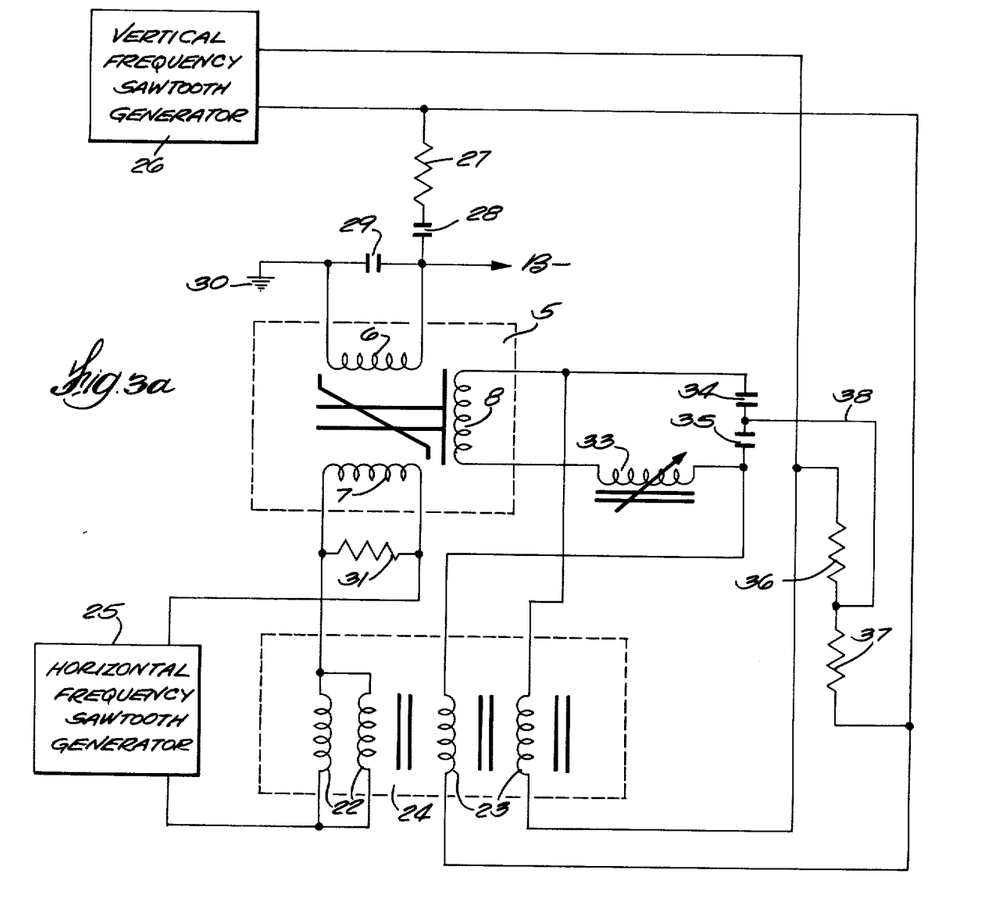
FIG. 3a is a circuit diagram of that portion of a television receiver that comprises apparatus for correcting pincushion distortion incorporating the saturable reactor illustrated in FIG. 1.

The principles of operation of the saturable reactor will be better understood in the light of the following explanation of a pincushion correction circuit in which it is connected, which circuit is illustrated in FIG. 3a.

In general, the circuit comprises a set of horizontal deflection coils 22 and a set of vertical deflection coils 23. As is well known, these two sets of deflection coils are wound on a magnetically permeable yoke 24 that is associated with the cathode ray tube or picture tube (not shown) of a television receiver.

Basically the horizontal deflection coils 22 are energized from a horizontal frequency sawtooth generator 25 that is not illustrated in detail inasmuch as its construction is well known. In like manner the vertical deflection coils receive their basic energization from a vertical frequency sawtooth generator 26 that is likewise of well known construction.

The horizontal frequency sawtooth generator produces a current of sawtooth wave form at a comparatively high horizontal frequency (15,750 Hz in United States standard practice). Each sweep of that current deflects the beam horizontally to scan along a line. The vertical frequency sawtooth generator produces a current of sawtooth wave form at a substantially lower frequency (60 Hz in United States standard practice). During each sweep of the vertical frequency current the beam is deflected vertically from line to line and is thus caused to scan through the full height of the raster.

The control coil 6 of the saturable reactor is connected with the vertical frequency sawtooth generator 26 in a wave shaping network that is here shown as comprising a resistor 27 and capacitors 28 and 29; and the control coil is also connected across a source of d.c. biasing current comprising the B-minus terminal of the receiver power supply and the chassis ground 30. The d.c. biasing current through the control coil induces in the core 5 a steady flux $\phi_b$ that partially saturates the core and ensures that the varying fluxes induced in it as described hereinafter will bring its flux saturation to the preferred area 9 of the B/H hysteresis loop.

By means of the wave shaping network, the sawtooth vertical frequency current $I_v$ (see FIG. 6) is converted to a current that has a parabolic wave form at the vertical frequency, as denoted by the curve $I_c$. The parabolic wave form develops by reason of the cooperation of the capacitors 28 and 29, the resistor 27 and the control coil functioning as an inductance. The manner in which the wave shaping network operates will be readily understood by those skilled in the art, who will also appreciate that other types of circuitry can be employed to obtain the parabolic wave form. It might be mentioned at this point that an ideal pincushion correction would be hyperbolic rather than parabolic, but in actual practice the use of a parabolic wave form — which is more easily obtained — brings about no normally perceptible deviation from an ideal correction.

The first load coil 7 is connected in a series circuit with the horizontal frequency sawtooth generator 25 and with the horizontal deflection coils 22, the latter being connected in parallel with one another, as is the contemporary practice. Thus all current flowing through the horizontal deflection coils also flows through the load coil 7. However, the d.c. resistance of the load coil 7 is preferably substantially less than one ohm and its inductance is on the order of 10% of that of the horizontal deflection coils; hence the first load coil and the horizontal deflection coils together offer a substantially constant load to the horizontal sawtooth drive circuit 25 without taking the additional energy that would be required if the first load coil were connected in parallel with the horizontal deflection coils and the drive circuit.

Figure 6:
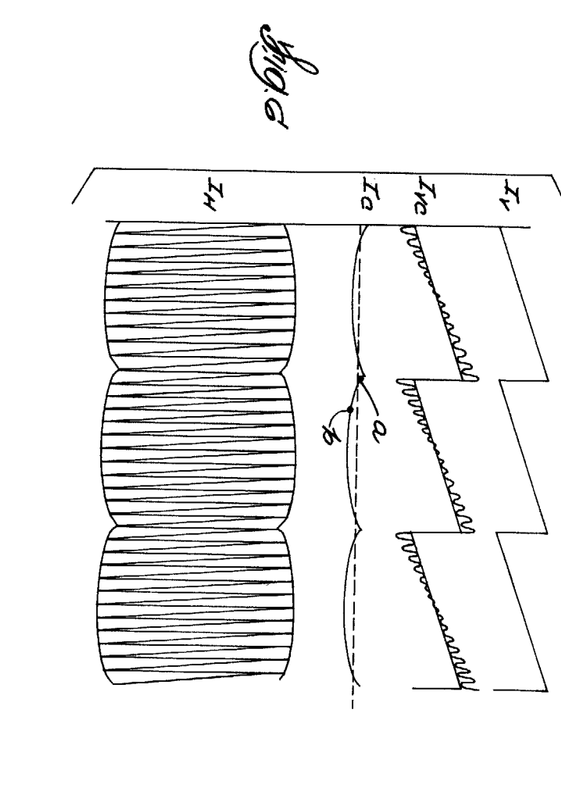
FIG. 6 is a graph of the several current waveforms that are developed in the pincushion correction apparatus of this invention.

At this point in the explanation it will already be apparent in a general way that the impedance of the first load coil 7 varies in step with the parabolic wave form control current $I_{vc}$ (see FIG. 6), owing to the varying flux saturation in the core that is induced by the current flowing in the control coil; and, as a result, the horizontal frequency current flowing through the first load coil and the horizontal deflection coils is modulated in amplitude as illustrated by curve $I_h$ in FIG. 6. (In that figure it will be appreciated that the horizontal frequency current wave is, for simplicity, shown with a much lower frequency than it actually has, as compared with the vertical frequency.)

A more specific explanation of the interrelationship between the currents flowing in the control coil 6 and in the first load coil 7 has regard to the magnetic flux fields in the core, as illustrated in FIGS. 5a–5d. As already mentioned, the flux $\phi_b$ that is due to the d.c. biasing current through the control coil is a steady one that threads the central leg segment 13 of the core and, in parallel magnetic circuits, the two outer leg segments. If — as is preferred — the central leg segment of the core, around which the control coil is wound, has approximately twice the cross section area of either outer leg segment, the flux component $\phi_b$ has a uniform density in all three leg segments, although it can be said that there are twice as many lines of the $\phi_b$ flux in the central leg segment as in either outer leg segment. The flux component $\phi_c$ that is due to the parabolic wave form current through the control coil similarly threads the entire core; and while it varies from instant to instant, it can be regarded as being (like the $\phi_b$ flux) of uniform density in all three leg segments at any one instant.

Figure 5A:
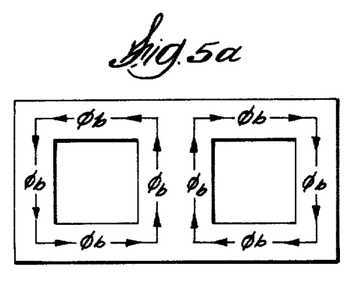
FIGS. 5a–5d are diagrams illustrating flux fields in the core of the saturable reactor shown in FIG. 1, under each of certain conditions that are described hereinafter.
Figure 5B:
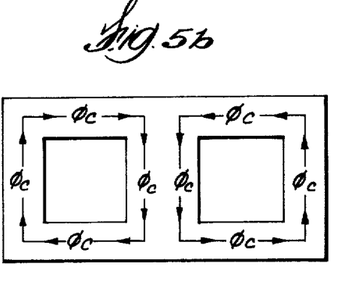
Figure 5C:
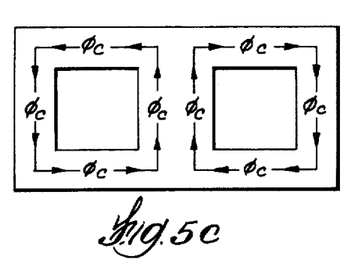

Since the control current $I_c$ is an alternating one, with a parabolic wave form, it can be regarded as crossing a horizontal zero line at a point between points $a$ and $b$ in FIG. 6. On that basis, the flux $\phi_c$ that is due to the control current can be said to alternately reinforce and oppose the biasing flux $\phi_b$. Thus in the part of the cycle denoted by point $a$ the control flux $\phi_c$ opposes the biasing flux $\phi_b$, as illustrated in FIG. 5b (as compared with FIG. 5a); whereas in the part of the cycle denoted by point $b$ the control flux $\phi_c$ reinforces the biasing flux $\phi_b$, the condition of the control flux then being as depicted in FIG. 5c and its then-existing relationship to the biasing flux being evident from a comparison of FIGS. 5c and 5a.

Figure 5D:
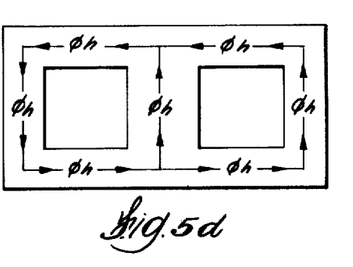

The horizontal frequency current flowing in the first load coil 7 also induces a flux $\phi_h$ in the core. That flux of course varies at the relatively high horizontal frequency. Its relationship to the biasing flux $\phi_b$ and to the control flux $\phi_c$ is as illustrated by FIG. 5d considered in conjunction with FIGS. 5a–5c. Note that the horizontal frequency flux $\phi_h$ threads the central leg segment 13 and the right outer leg segment 14 in magnetic circuits that are in parallel with the left outer leg segment 12. The biasing flux $\phi_b$ would thread the outer leg segments symmetrically in the absence of the flux $\phi_h$, but the flux density is not symmetrical in the two outer leg segments when the flux $\phi_h$ is present.

Thus the flux fields through the respective leg segments of the core, during the part of the control current cycle denoted by point $a$ in FIG. 6, are given by:

Left outer: $\phi_b - \phi_c + \phi_h$
Central: $2\phi_b - 2\phi_c + \phi_h$
Right outer: $\phi_b - \phi_c - \phi_h$ and during the part of the control current cycle denoted by point $b$, by:

Left Outer: $\phi_b + \phi_c + \phi_h$
Central: $2\phi_b + 2\phi_c + \phi_h$
Right outer: $\phi_b + \phi_c - \phi_h$ Thus in the first ($a$) condition there is a comparatively low flux saturation in the leg segment 12 of the core and consequently the first load coil 7 has a comparatively high impedance; while in the other ($b$) condition there is a high flux saturation in the core leg 12, and the first load coil has a comparatively low impedance. Since the variation of flux concentration in the outer leg segment 12 is a function of the vertical frequency parabolic wave current flowing through the control coil 6, the horizontal frequency current $I_h$ flowing through the first load coil is modulated as illustrated in FIG. 6.

It will be apparent that the horizontal frequency current flowing through the first load coil 7 induces a flux concentration in the central leg segment 13 of the core that varies at the horizontal frequency and tends to induce a horizontal frequency current component in the control coil 6. But the control coil has an extremely high impedance to the relatively high horizontal frequency and acts as a choke that suppresses even the harmonics of the horizontal frequency. Consequently there is substantially no reflection back of horizontal frequency signals, or of their harmonics, from the control coil 6 into the vertical frequency driver 26, and therefore the apparatus presents no interlace problems.

There is a possibility of some harmonics of the horizontal frequency being developed in the first load coil 7, and these would of course produce disturbances or distortions in the raster presentation. Tests indicate that such disturbances are not likely to attain any significant magnitude in practice, but in any event a damping resistor 31 can be connected across the terminals of the first load coil to effectively suppress any such unwanted signals.

The second load coil 8 is effectively connected in series with the vertical deflection coils 23. In FIG. 3a the second load coil is shown as connected between the vertical deflection coils, but it will be understood that other series circuit arrangements of those three coils could be used.

From the fact that the second load coil 8 has its axis transverse to the flux path through the core leg that it embraces, it will be apparent that there will be no transformer action between the second load coil and either of the other two coils. This is to say that the impedance of the second load coil is affected by the currents through the other two coils, but there is no induction of e.m.f. as between it and them.

Reactance of the second load coil will vary as a function of variation in flux density in the outer core leg segment 14 around which it is wound. The dominant factors in producing flux through that leg segment are the d.c. biasing current through the control coil and the vertical frequency sawtooth current through the second load coil itself.

As a vertical sweep progresses from the top of the raster to its central line, the vertical frequency sawtooth current through the second load coil is responsible for a steadily increasing flux density in the core leg 14; and then, during continued vertical progress of the sweep to the bottom of the raster, the flux density due to the vertical frequency current steadily decreases. A flux at the horizontal frequency, due to the horizontal frequency current through the first load coil 7, also tends to thread through the core leg 14 which the second load coil 8 embraces. For any one cycle at the horizontal frequency, the relatively low frequency vertical sawtooth current through the second load coil represents an effective d.c. bias on the core, which bias is augmented by the true d.c. bias impressed by means of the control coil 6. Over the course of half a raster scan that bias on the core leg 14 varies from a minimum, such that the horizontal frequency flux variations in that core leg can have a maximum amplitude, to a saturation such that the horizontal frequency flux variations have substantially zero amplitude. As a result, the current through the second load coil 8 is as represented by the curve $I_{vc}$ in FIG. 6.

If there were a transformer relationship between the second load coil and the first load coil, a horizontal frequency current would be induced in the second load coil that would be 90° out of phase with the horizontal wave form required for top and bottom pincushion correction, and obtaining the necessary phase correction would be complicated at best.

With the 90° relationship between the axes of the load coils 7 and 8 that is a feature of the saturable reactor of the present invention, the horizontal frequency component of current through the second load coil tends to be 180° out of phase with the desired correction. This is to say that if the current through the vertical deflection coils and the second load coil were solely influenced by the varying fluxes in the core leg 14, its horizontal frequency component would be of the phase to aggravate pincushion distortion, rather than correcting it. To effect the required phase inversion, the second load coil is connected in a series resonant circuit with a variable reactance phase coil 33 and a pair of capacitors 34 and 35 that are of like capacitance values. By means of this circuit the pulses of horizontal frequency current that are developed in the second load coil are filtered into a sinusoidal wave shape and have their polarity reversed. The resonant circuit also insures that the horizontal frequency component of the $I_{rc}$ waveform will have adequate amplitude for top and bottom pincushion correction.

Figure 3B:
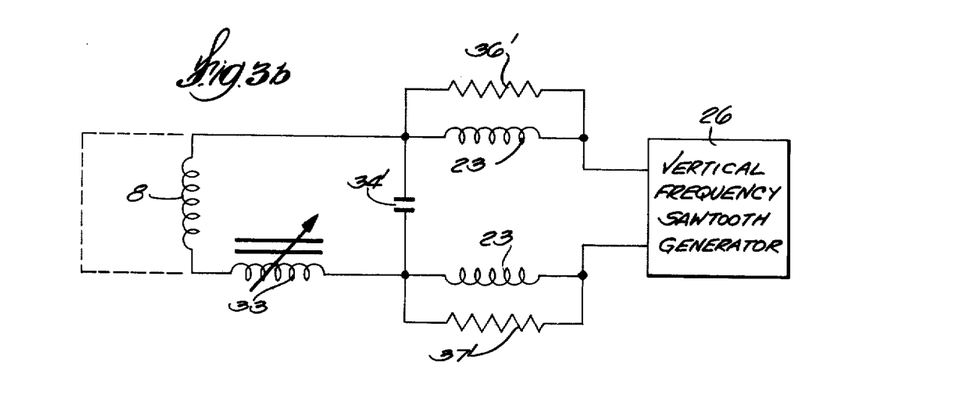

As shown in FIG. 3a a pair of identical resistors 36 and 37 are connected in series with one another across the input terminals of the vertical deflection coils, and the junction of those two resistors is connected, as by a conductor 38, with the junction of the two capacitors 34 and 35. The resistors 36 and 37 are conventional damping resistors and are connected across the vertical deflection coils through the capacitors 34 and 35. Those two capacitors function as a single capacitance in the resonant circuit comprising the second load coil, and the reason for using both of them is to prevent feedback of horizontal frequency current into the vertical frequency driver 26, thus avoiding interlacing problems.

Where such feedback of horizontal frequency is not expected to be a problem, the second load coil 8 can be connected with the vertical deflection coils in a circuit such as is illustrated in FIG. 3b, wherein the series resonant circuit comprising the load coil 8 and the variable reactance phase coil 33 includes a single capacitor 34', and the damping resistors 36' and 37' are connected directly across the respective vertical deflection coils 23. It will be understood that the circuit illustrated in FIG. 3b can in all other respects be identical with that of FIG. 3a.

Adjustment of the variable reactance phase coil 33 permits the series resonant circuit which includes said coil to be tuned to the approximate resonant frequency of the horizontal pulses.

Figure 2:
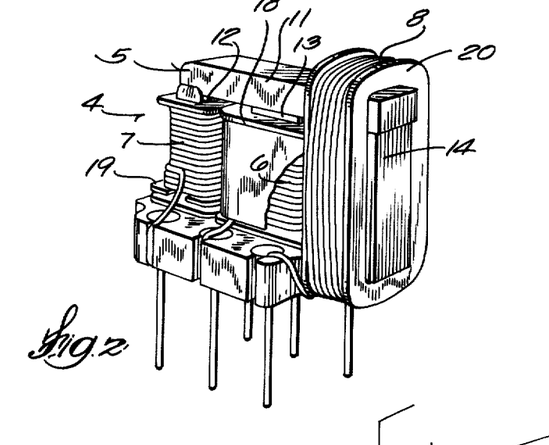
FIG. 2 is a side perspective view of an embodiment of the saturable reactor that is illustrated diagrammatically in FIG. 1.

It will be evident from the foregoing explanation that in the saturable reactor of FIGS. 1 and 2, any pair of coils could function independently of the third. Thus the principles of this invention, in their essentials, can be embodied in various two coil saturable reactors of general utility.

Figure 7:
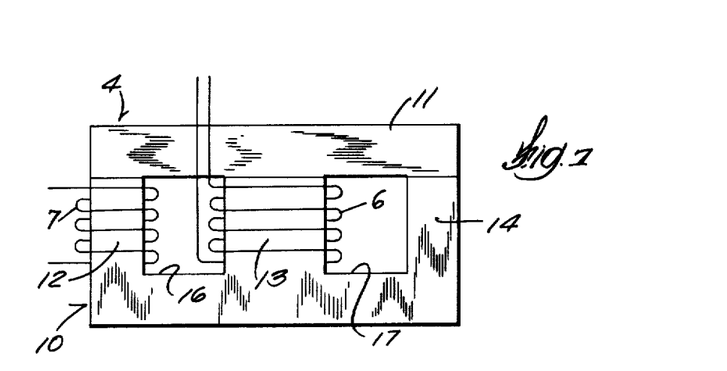
FIGS. 7 and 8 are views generally similar to FIG. 1 but illustrating modified embodiments of the saturable reactor of this invention.

FIG. 7 illustrates one form of such a saturable reactor, corresponding essentially to that illustrated in FIG. 1, but with the second load coil omitted. Notwithstanding the omission of that coil, the core must include the outer leg segment 14 around which the second load coil would be wound, or an equivalent diversion flux path that is in parallel magnetic circuit with the leg segments 12 and 13. The principles of operation of the FIG. 7 device will be apparent from that portion of the foregoing description that relates to the operation of the control coil and the first load coil in their functional relationship to one another. In a television receiver, the saturable reactor of FIG. 7 would of course be useful and very desirable if only side pincushion correction were required, in which case the connections of its control coil and load coil would be as illustrated in FIG. 3a.

Figure 8:
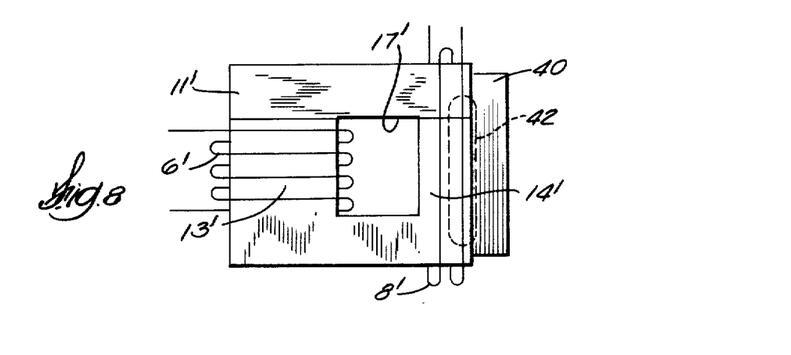

FIG. 8 illustrates another form of two coil saturable reactor embodying the principles of the present invention, useful for adding a variable amplitude current at one frequency to a current at another frequency. In this case the core can have only a single window 17' and can correspond in all respects to the two window core 5 that is illustrated in FIG. 1, but with all of that portion removed therefrom that is to the left of the central leg 13. Similarly, a first coil 6' and a second coil 8' correspond in essentials — and particularly in their orientations relative to one another and to the core — to the coils 6 and 8 of FIG. 1.

The core of the saturable reactor illustrated in FIG. 8 can be designed with a sufficiently small cross-section area to provide adequate flux saturation from the currents through its coils. However, if coil and current parameters do not permit this, a constant value biasing flux denoted by 42, can be fed into the leg segment 14' that is embraced by the load coil 8' from a permanent magnet 40 shown attached to said leg segment.

As will be evident from a consideration of FIG. 8 in relation to FIG. 3a, the saturable reactor of FIG. 8 can be used in a television receiver for effecting only top and bottom raster correction. Its load coil 8' would be connected in a series circuit with the vertical frequency sawtooth generator, the vertical deflection coils and resonant circuit means, generally like the series circuit in which the second load coil 8 is connected in FIG. 3a. However, its control coil 6' would be connected with the horizontal frequency sawtooth generator to provide the horizontal frequency component needed for modification of the vertical sawtooth waveform. Thus the coil 6' would function as a control coil, but its connections in the raster control circuit could be generally like those shown for the first load coil 7 in the circuit of FIG. 3a. This follows from the fact that in the FIG. 3a circuit the first load coil 7 performs a dual role, being a load coil in the sense that it controls current through the horizontal deflection coils in response to current through the control coil 6, but being also a control coil in relation to its effect upon current through the second load coil 8. It will be understood, however, that in such a circuit for effecting only top and bottom raster correction, the coil 6' would be designed to have as little inductance as possible, so that its effect upon the current through the horizontal deflection coils would be minimized.

Returning to the saturable reactor illustrated in FIGS. 1 and 2, as incorporated in the circuit illustrated in FIG. 3a, it will be noticed that the circuit includes no potentiometer for adjustment of the amount of top and bottom correction. Instead, such adjustments are effected at the saturable reactor itself.

Moving the I-segment 11 endwise relative to the E-shaped part of the core varies the flux density through the leg segment 14 relative to that through the remainder of the core and thus effects adjustment of so-called bow-tie symmetry, that is the symmetry of the top and bottom raster correction. Moving the second load coil 8 axially relative to the core adjusts the coupling of that coil to the core and thus effects adjustment of the amplitude of top and bottom correction.

From the foregoing description taken with the accompanying drawings it will be apparent that this invention provides a novel and improved saturable reactor and a circuit in which that saturable reactor can be advantageously connected in the deflection circuits of a television picture tube for pincushion correction of its raster. It will also be apparent that as compared with prior saturable reactors, that of this invention is superior in several respects, including lower cost, greater compactness and more accurate operation, and that it reduces both the labor and component content of a pincushion corrector circuit in which it is connected.

Those skilled in the art will appreciate that the invention can be embodied in forms other than as herein disclosed for purposes of illustration.

The invention is defined by the following claims.

I claim:

1. In apparatus for electromagnetically deflecting the electron beam of a cathode ray tube to cause it to scan a raster, comprising horizontal deflecting coil means by which the beam is deflected in one direction for linear scan at a horizontal frequency, vertical deflecting coil means by which the beam is deflected in another direction transverse to said one direction at a substantially lower vertical frequency, horizontal sawtooth generator means for generating a sawtooth wave current at said horizontal frequency, and vertical sawtooth generator means for generating a sawtooth wave current at said vertical frequency, means for correcting distortion of the raster comprising:
   A. a magnetically saturable core having a pair of portions that are in series magnetic circuit with one another and provide leg segments;
   B. a control coil wound transversely only around one of said leg segments of said core, said control coil in its association with said core having a high reactive impedance to current at the horizontal frequency;
   C. a parabolic wave shaping circuit in which said control coil is connected and which is connected with the vertical sawtooth generator means, for producing a control current which is at said vertical frequency and which has a substantially parabolic wave shape;
   D. a load coil
      1. wound transversely only around the other of said leg segments and
      2. connected in series circuit with the horizontal sawtooth generator means and with the horizontal deflecting coil means,
   said load coil in its association with the core having a substantially low reactive impedance to current at the horizontal frequency and providing for modulation by said control current of the horizontal frequency sawtooth wave current flowing through the horizontal deflecting coil means; and
   E. magnetically saturable means defining a flux path which is in parallel magnetic circuit with said two leg segments of said core, and which can thus be threaded by flux induced by current through either of said coils in bypassing relation to the leg segment around which the other coil is wound.

2. The apparatus of claim 1, further characterized by:
   F. a second load coil wound in lengthwise embracing relationship to said magnetically saturable means to have its axis transverse to lines of flux induced therein by each of the other coils;
   G. means connecting the vertical sawtooth generator means, the vertical deflecting coil means and said second load coil in series circuit with one another; and
   H. phase correction means connected in a series resonant circuit with said second coil and comprising
      1. a phase coil and
      2. a capacitor means.

3. The apparatus of claim 1, further characterized by: means connecting said control coil with a source of direct current, to induce in the core a steady flux that partially saturates it.

4. The apparatus of claim 1 wherein said leg segments comprise two legs of a two-window core and said magnetically saturable means comprises the third leg thereof, further characterized by:
   said leg around which the control coil is wound being substantially thicker than each of the other two legs.

5. In apparatus for electromagnetically deflecting the electron beam of a cathode ray tube to cause it to scan a raster, comprising horizontal deflecting coil means by which the beam is deflected in one direction for linear scan at a horizontal frequency, vertical deflecting coil means by which the beam is deflected in another direction transverse to said one direction at a substantially lower vertical frequency, horizontal sawtooth generator means for generating a sawtooth wave current at said horizontal frequency, and vertical sawtooth generator means for generating a sawtooth wave current at said vertical frequency, means for correcting distortion of the raster comprising:
   A. a magnetically saturable core having a pair of elongated segments that are lengthwise in a magnetic series circuit with one another, one of said segments having a transverse cross section of substantially larger area than the other;
   B. a first coil wound transversely around said one segment of said core and connected with the horizontal sawtooth generator means to have current at the horizontal frequency flow therethrough;
   C. a second coil wound lengthwise around the other of said core segments to have its axis transverse to the lines of flux in said magnetic series circuit;
   D. means connecting the vertical sawtooth generator means, the vertical deflecting coil means and said second coil in series circuit with one another; and
   E. phase correction means connected in a series resonant circuit with said second coil and comprising
      1. a phase coil and
      2. capacitor means.

6. The apparatus of claim 5 wherein said first coil has a low reactive impedance to current at the horizontal frequency, further characterized by:
   F. said core having a further portion which is in parallel magnetic circuit with each of said elongated segments;
   G. a third coil wound transversely around said further portion of the core and having, in its association with the core, a substantially high reactive impedance to current at the horizontal frequency;
   H. a parabolic wave shaping circuit in which said third coil is connected and which is connected with the vertical sawtooth generator means, for causing a control current to flow through the third coil that is at said vertical frequency and has a substantially parabolic wave shape; and
   I. means connecting said first coil in a series circuit with the horizontal deflecting coil means as well as with the horizontal sawtooth generator means, so that said first coil provides for modulation by said control current of the horizontal frequency sawtooth wave current flowing through the horizontal deflecting coil means.

7. The apparatus of claim 5, further characterized by:
permanent magnet means operatively associated with said core to cause a steady flux to thread it by which the core is partially saturated.

8. In apparatus for electromagnetically deflecting the electron beam of a cathode ray tube to cause it to scan a raster, comprising horizontal deflecting coil means by which the beam is deflected in one direction for linear scan at a horizontal frequency, vertical deflecting coil means by which the beam is deflected in another direction transverse to said one direction at a substantially lower vertical frequency, horizontal sawtooth generator means for generating a sawtooth wave current at said horizontal frequency, and vertical sawtooth generator means for generating a sawtooth wave current at said vertical frequency, means for correcting distortion of the raster comprising:
  A. a two-window magnetically saturable core having three spaced apart parallel leg segments comprising a pair of outer leg segments and a central leg segment;
  B. a control coil wound transversely around the central leg segment of said core, for developing in the core a flux that varies in density in step with variations in a control current through said control coil, said control coil in its association with said core having a high reactive impedance to current at the horizontal frequency;
  C. means connecting said control coil in a parabolic wave shaping circuit connected with the vertical sawtooth generator means, for producing a control current through the control coil which is at said vertical frequency and which has a substantially parabolic wave shape;
  D. a first load coil wound transversely around one of said outer leg segments and connected in series circuit with the horizontal sawtooth generator means and with the horizontal deflecting coil means, said first load coil in its association with the core having a substantially low reactive impedance to current at the horizontal frequency and providing for modulation by said control current of the horizontal frequency sawtooth wave current flowing through the horizontal deflecting coil means;
  E. a second load coil wound lengthwise around the other of said outer leg segments, so as to have its axis transverse to said other outer leg segment;
  F. means connecting the vertical sawtooth generator means, the vertical deflecting coil means and the second load coil in series circuit with one another; and
  G. phase correction means connected in a series resonant circuit with the second load coil and comprising
    1. a phase coil and
    2. capacitor means.

9. The apparatus of claim 8, further characterized by:
means connecting said control coil with a source of direct current, to induce in the core a steady flux that partially saturates it.

10. The apparatus of claim 8 wherein the central leg of the core has a cross section area, as measured transversely to its length, which is substantially greater than that of each of the outer leg segments.

* * * * *